C. GORE.
SPEED INDICATOR FOR AUTOMOBILES.
APPLICATION FILED DEC. 22, 1915.
1,284,091.
Patented Nov. 5, 1918.
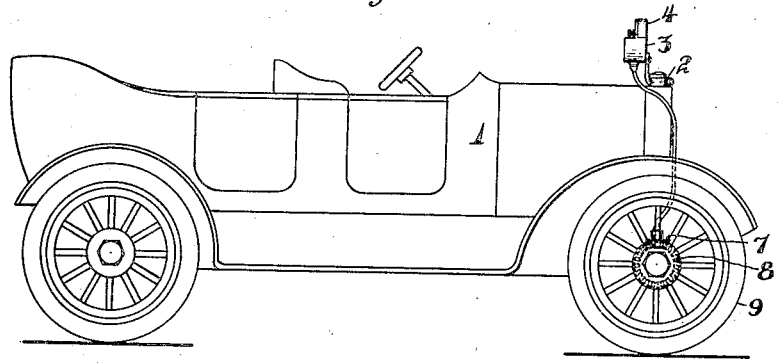
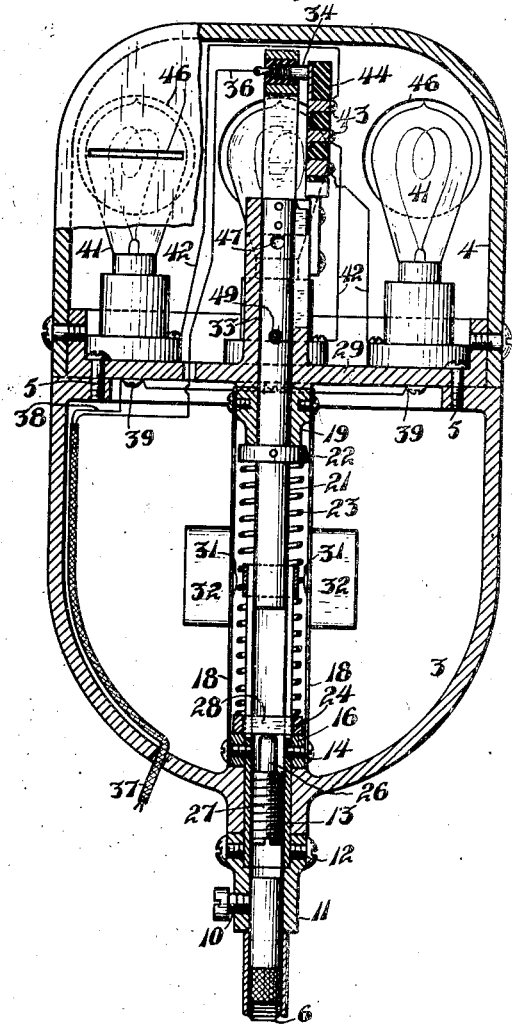
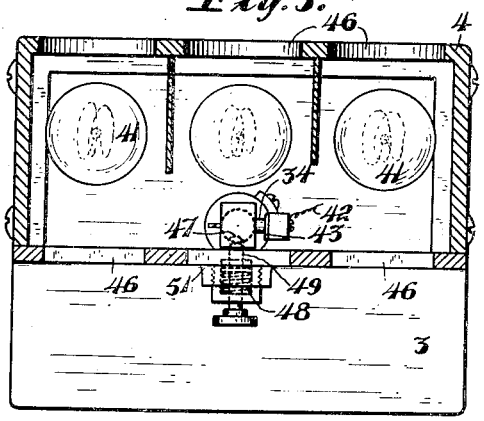
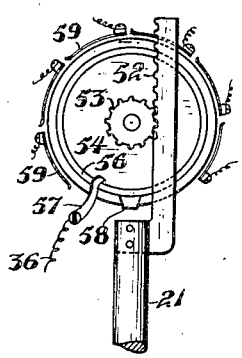
Inventor,
Charles Gore,
By Francis M. Wright
Attorney

UNITED STATES PATENT OFFICE.

CHARLES GORE, OF SAN FRANCISCO, CALIFORNIA.

SPEED-INDICATOR FOR AUTOMOBILES.

1,284,091.  Specification of Letters Patent.  Patented Nov. 5, 1918.

Application filed December 22, 1915. Serial No. 68,284.

*To all whom it may concern:*

Be it known that I, CHARLES GORE, a subject of the King of Great Britain, residing at San Francisco, in the county of San Francisco and State of California, have invented new and useful Improvements in Speed-Indicators for Automobiles, of which the following is a specification.

This invention relates to an apparatus in which a signal indicates the fact that the speed of an automobile or other vehicle has exceeded a predetermined limit, and is an improvement upon the invention for which U. S. Patent No. 1,091,059 was granted to me March 24, 1914.

In that patent there was disclosed an apparatus by which lights of different colors appeared at the front of the automobile, the colors indicating different rates of speed of the automobile. This effect was obtained by causing a disk, having variously colored translucent sectors, to rotate with the increase of speed of the automobile, and it was provided that said disk would only advance with the increase of speed, and would not be retracted with the diminution of speed. The object of this arrangement was, among others, to provide a positive proof that the automobile was not exceeding the legal speed, if, in fact, it had not so exceeded it, this proof being dependent upon the fact, which could easily be established afterward by trial, that when the automobile exceeded the legal speed a lamp of a certain color, as red, would shine, and that it would continue to so shine even though the speed was again reduced, and by the further fact that the change of the color of the lamp could not be effected without the driver leaving his position close to the steering wheel, and, in fact, getting out of the car to readjust the indicating mechanism. Automobilists were thus saved the annoyance of having to pay unjust fines, on the mere statement of a village constable or other person that they were exceeding the legal speed, when they were not so exceeding it.

The other colors were of use to the driver of the machine as indicating the increase of speed of the machine, and especially one color was useful as indicating when the machine was approaching the illegal speed, so that the driver might immediately reduce the speed of the automobile to a safety speed.

However, the apparatus disclosed in my patent above referred to was defective in this respect that, when once the apparatus had indicated a higher speed, even though this was not the highest or illegal speed, it could not thereafter indicate a lower speed without the apparatus being reset, which could only be done by the driver stopping his car and leaving his seat. Consequently, when the automobile had reached what may be called the danger speed, that is, one approaching an illegal speed, the indicating device would remain in the position indicating the danger speed, even though the speed might afterward be reduced to a safety speed. Then the driver would no longer know whether or not he was running at the safety speed.

The object of the present invention is to provide such an indicating device in which, although, when the highest speed is reached, the indicating device will be locked, so that it can not be changed without stoppage of the car and the driver leaving his seat and manipulating the apparatus by hand, yet, at lower speeds, and especially at the danger speed, the indicator will automatically change from "Danger" to "Safety" when the speed is correspondingly reduced.

In the accompanying drawing, Figure 1 is a side view of an automobile equipped with my invention; Fig. 2 is an enlarged broken vertical section of the signaling device; Fig. 3 is a plan view thereof, the casing being removed; Fig. 4 is a detail view of a modification of the invention.

Referring to the drawings, 1 indicates an automobile to which my invention is applied. On any suitable part of the automobile, preferably in front, is secured a bracket 2 by which is supported a lower casing 3. A flexible shaft 6 is connected at its lower end to a bevel pinion 7 meshing with a bevel gear 8 rotating with the front wheel 9 of the automobile, and at its upper end, 10 as shown at 10, with a sleeve 11, which sleeve is connected, as shown at 12, with a tube 13, connected, as shown at 14, with a short thick tube 16, secured to diametrically opposite vertical narrow spring metal strips 18, which are secured at their upper ends to a short tube 19 around a vertical rod 21, having secured thereon a collar 22, against which the lower end of the tube 19 abuts. A spring 23 is coiled around the rod 21 and is compressed between said collar 22 and a collar 24 around the tube 13. A pin 26 has a head 27 which is screwed within the tube 13 and abuts against a cross piece 28 on the collar 24, said tube 13 having diametrically opposite vertical slits to permit said cross piece to extend therethrough. By screwing up said pin, the height of the collar may be varied to vary the degree of compression of the spring.

When at rest, said tube 19 abuts against the under side of the base 29 of an upper casing 4, secured, as shown at 5, to the lower casing. Said spring metal strips 18 are secured, as shown at 31, to weights 32, so that when the front wheel of the automobile, and consequently the shaft 6, turns, the weights 32 move outwardly, and since the lower ends of the flexible band are fixed, their upper ends descend against the action of said spring carrying with them the collar 19 and vertical rod 21.

Said vertical rod slides in a guideway 33 formed integral with the base 29. At its upper end said rod carries a contact maker 34 which is electrically connected by a wire 36, leading, as shown at 37, to a source of electricity, another wire 38 leading from said source to one terminal 39 of each of a series of lamps 41, the other terminals of which are connected by wires 42 with insulated contacts 43 adapted successively, in the vertical movement of the rod 21, to contact with the contact maker 34. The surface of the upper of said contacts 43 is sufficiently long to be in contact with the contact maker while the machine is at rest and while it is moving at a slow speed. When moving at a higher speed, the contact maker 34 is in contact with the second of these contacts, and it will be observed that the insulation 44 between the contacts is sufficiently narrow that at no time is the contact 34 out of contact with one or the other of said contacts 43. When the machine is moving at an excessive speed, the contact maker 34 is in contact with the last contact 43.

The globes of the lamps 41 are of different colors, as, for instance, that of the lamp electrically connected with the upper contact 43 is white or transparent, that of the lamp electrically connected with the lowest contact 43 is red, and that electrically connected with the intermediate contact 43 green. Other colors would be used, if there were more than three lamps. These lamps shine through holes 46 formed in the front wall of the upper casing 4, and through narrow slits 46' in the rear wall of the casing, so that the light is visible both from the front and the rear, but the amount of light shining through the rear wall is not sufficient to dazzle the eyes of the driver.

In said rod 21 is formed a socket 47 and adapted to be pressed into said socket by a spring 48 is a latch 49 slidable in a casing 51 secured to the upper casing 4. If the driver exceeds the speed limit, the latch 49 passes into the socket 47 and holds the rod 21 in the position in which the red light is shown. In order to restore the rod to its normal position, the driver must take hold of the head of the latch and pull it from its socket.

The locking device, consisting of the latch 59 and the socket 47, provides a positive proof that the speed limit has not been exceeded when in fact it has not been. For, if it has been exceeded, this will appear by the shining of the red light, because the reduction of the speed after the speed limit has been exceeded does not thereby extinguish the red light. The only way in which the red light can be extinguished is for the driver to stop the machine and extinguish it by pulling the latch out of the socket. The green lamp constitutes a danger signal, indicating that the speed is approaching the speed limit. When the driver sees the green light he should at once reduce the speed until the green light is no longer visible, for otherwise he might exceed the speed limit before he is aware of it. There is no locking device locking the circuit closer in the position causing the green lamp to be visible, for the very reason that it is desirable that this green lamp should be extinguished when the speed is reduced below the danger speed. The light indicating the safety speed is not absolutely necessary, and may, or may not, be employed as desired.

In the modification of the invention shown in Fig. 4, a rack 52 is attached to the rod 21 and engages a pinion 53 upon a wheel 54 having a conducting ring 56 engaged at all times by a spring contact 57 attached to the wire 36, said wheel having a contact 58 which is adapted to contact with any one of a series of spring contacts 59, which corresponds to the several contacts 43.

The mode of operation of the apparatus will be readily understood from the foregoing description and its advantages will also be readily seen.

I claim:—

1. In combination with the running mechanism of a vehicle, a centrifugal governor, an operative connection between said mechanism and governor, speed signals, a reciprocable device, operatively connected with said governor, for operating the several signals at corresponding speeds of the governor, and means for locking said device in the position in which it operates the signal when the governor is rotating at the highest speed, said device being free to reciprocate at all lower speeds, said means being so located that it cannot be unlocked by the driver of the vehicle when in a position for driving.

2. In combination with the running mechanism of a vehicle a centrifugal governor, an operative connection between said mechanism and governor, a series of differently colored lamps, a circuit closer for closing the circuits through the several lamps and adapted to be reciprocated by the governor, and means for locking the circuit closer in the position in which it closes the circuit in which is the lamp illuminated when the vehicle is at the highest speed, said circuit closer being free to be reciprocated at all lower speeds, said means being so located that it cannot be unlocked by the driver of the vehicle, when in a position for driving.

In testimony whereof I have hereunto set my hand in the presence of two subscribing witnesses.

CHARLES GORE.

Witnesses:
G. M. BALL,
D. B. RICHARDS.